(12) United States Patent
Hiebert et al.

(10) Patent No.: US 9,647,829 B1
(45) Date of Patent: *May 9, 2017

(54) ENABLING RX SIGNAL PATH SYNCHRONIZATION AND ALIGNMENT SIGNALS IN A HIGHLY INTEGRATED TX RFIC

(71) Applicant: Maxlinear Asia Singapore PTE LTD., Singapore (SG)

(72) Inventors: Mark Hiebert, New Westminister (CA); Jay Chen, Vancouver (CA)

(73) Assignee: Maxlinear Asia Singapore Pty Ltd., Singapore (SG)

( * ) Notice: Subject to any disclaimer, the term of this patent is extended or adjusted under 35 U.S.C. 154(b) by 54 days.

This patent is subject to a terminal disclaimer.

(21) Appl. No.: 14/690,096

(22) Filed: Apr. 17, 2015

Related U.S. Application Data

(63) Continuation of application No. 13/902,511, filed on May 24, 2013, now Pat. No. 9,020,011.

(51) Int. Cl.
| | |
|---|---|
| *H04B 1/38* | (2015.01) |
| *H04L 5/16* | (2006.01) |
| *H04L 7/02* | (2006.01) |
| *H04B 1/40* | (2015.01) |
| *H04B 7/0413* | (2017.01) |

(52) U.S. Cl.
CPC .............. *H04L 7/02* (2013.01); *H04B 1/40* (2013.01); *H04B 7/0413* (2013.01)

(58) Field of Classification Search
CPC ...... H01Q 3/267; H04B 17/004; G01S 19/23; H03C 3/40; H03D 7/1441
USPC ....... 375/219, 150, 285, 296, 346, 141, 146, 375/319, 235, 224, 267; 455/76, 260, 455/127, 333, 323; 708/313; 327/113
See application file for complete search history.

(56) References Cited

U.S. PATENT DOCUMENTS

| | | |
|---|---|---|
| 7,031,669 B2 | 4/2006 | Vaidyanathan et al. |
| 7,567,611 B2 | 7/2009 | Chien |
| | (Continued) | |

FOREIGN PATENT DOCUMENTS

| | | |
|---|---|---|
| EP | 1496567 | 1/2005 |

OTHER PUBLICATIONS

U.S. Appl. No. 13/902,511, Notice of Allowance dated Feb. 27, 2015.

*Primary Examiner* — Aristocratis Fotakis
*Assistant Examiner* — Fabricio R Murillo Garcia
(74) *Attorney, Agent, or Firm* — McAndrews, Held & Malloy, Ltd.

(57) ABSTRACT

A transmit (TX) signal path circuit in a multiple-input, multiple-output (MIMO) transceiver responsive to a digital front end (DFE) for generating receive (RX) path phase alignment signals is disclosed. A digital up-conversion block uses a first numerically-controlled oscillator (NCO) for generating digital intermediate frequency (IF) signals for ordinary TX signal generation, and a different, second NCO for generating digital IF signals for RX phase alignment signal generation. An RF up-conversion block uses a TX local oscillator (LO) for generating analog RF signals for ordinary TX signal generation, and a different feedback (FB) LO for generating analog RF signals for RX phase alignment signal generation. Thus, phase alignment of the circuitry used for ordinary TX signal generation is left undisturbed by RX phase alignment signal generation.

34 Claims, 9 Drawing Sheets

(56) References Cited

U.S. PATENT DOCUMENTS

| | | |
|---|---|---|
| 7,778,345 B2 | 8/2010 | Sperlich et al. |
| 7,822,147 B2 | 10/2010 | Huang et al. |
| 8,126,040 B2 | 2/2012 | Liu et al. |
| 8,126,086 B2 | 2/2012 | Bai et al. |
| 8,208,572 B2 | 6/2012 | Dounaev et al. |
| 2007/0099580 A1 | 5/2007 | Hosokawa et al. |
| 2008/0285637 A1* | 11/2008 | Liu ............... H04B 17/20 375/224 |
| 2009/0058475 A1* | 3/2009 | Jung ............... H03D 7/161 327/113 |
| 2009/0116578 A1* | 5/2009 | Sperlich ........... H03F 1/3247 375/285 |
| 2010/0127932 A1* | 5/2010 | Heikkinen ......... H04B 17/21 342/374 |
| 2010/0166046 A1 | 7/2010 | Ammann et al. |
| 2011/0158297 A1* | 6/2011 | Ding ............... H03D 3/009 375/219 |
| 2011/0273197 A1 | 11/2011 | Banerjee et al. |
| 2012/0069931 A1 | 3/2012 | Gandhi et al. |
| 2012/0315866 A1* | 12/2012 | Rebel ............... H03B 5/32 455/164.1 |

\* cited by examiner

ENABLING RX SIGNAL PATH SYNCHRONIZATION AND ALIGNMENT SIGNALS IN A HIGHLY INTEGRATED TX RFIC

CROSS REFERENCE TO RELATED APPLICATIONS

This application is a continuation application of U.S. patent application Ser. No. 13/902,511 filed May 24, 2013, the contents of which is incorporated herein by reference.

FIELD

The present invention relates generally to wireless transceivers. More particularly, the present invention relates to receive signal path phase alignment in multiple-input and multiple-output transceivers.

BACKGROUND

Modern wireless infrastructure communication networks (e.g. 3G and 4G mobile communications networks) heavily employ multiple-input and multiple-output (MIMO) transmit (TX) and receive (RX) signal paths to maximize the capacity of each base transceiver station (BTS). The number of signal paths in a given direction (i.e. RX or TX) is typically large enough that they cannot feasibly be co-integrated in a single radio frequency integrated circuit (RFIC). In addition, integration of all RX signal paths or TX signal paths on a single RFIC is ordinarily not practical or commercially viable due to the limitations in state of the art integration capabilities for RFIC designs, and furthermore as it remains desirable to support flexible MIMO array sizes.

A known MIMO transceiver 10 is shown in FIG. 1. By way of example, the transceiver has four TX signal paths 12 labeled "TX Path X", and likewise four RX signal paths 14 labeled "RX Path X", where X=A, B, C, or D. It will be appreciated, however, that any suitable number of TX signal paths or RX signal paths may be provided, and that four are shown in FIG. 1 by way of example only. Each TX signal path 12 and each RX signal path 14 is generally embodied in a corresponding circuit which may be a printed circuit board (PCB) or an RFIC. Ordinarily, each TX signal path 12 outputs to a corresponding power amplifier 16 which is connected to a corresponding coupler 18 and thence to a corresponding antenna 20. Also connected to each coupler 18 there is ordinarily provided a corresponding low noise amplifier 22 leading to a corresponding one of the RX signal paths 14. Digital baseband TX and RX signals are communicated to and from a digital front end (DFE) 28 coupled to the TX signals paths 12 and the RX signals paths 14.

The MIMO signal processing techniques employed in such transceivers often rely on a fixed phase alignment amongst all RX signal paths and amongst all TX signal paths. Where each RX signal path is integrated on a corresponding RX RFIC, for example, the RX phase alignment must therefore be achieved across multiple RX RFICs, and similarly for the TX signal paths.

Aligning the phase of each unique RX signal path to the others in the RX array, and each unique TX signal path to the others in the TX array, is a significant challenge. In some applications, it is desirable to achieve phase alignment within accuracies of under 1° of the RF carrier. At radio frequency (RF) carrier frequencies sometimes employed in such communication networks (e.g. typically 1-3 GHz), 1° of RF phase corresponds to the order of 1 ps in units of time.

Achieving this degree of alignment between multiple independent RX signal paths on the one hand, and between multiple TX signal paths on the other hand, is usually only practically achievable by employing board level calibration and alignment activities to calibrate all manufacturing variability and mismatches between each unique RX and TX signal path that makes up the overall MIMO transceiver array.

In order to achieve the desirable phase alignment between multiple separate RX signal paths that employ separate RX signal path circuits, a common strategy is to generate locally an alignment signal which sweeps across the RX frequency band in order to calibrate any differences in the phase delay of separate RX signal paths that are variable across the frequency band of interest. This alignment signal may be monitored by all of the local RX signal paths, and by comparing the received signals the phase alignment for each RX signal path can be measured and compensated for by the digital front end.

For this purpose, the MIMO transceiver 23 shown in FIG. 2 is similar to the MIMO transceiver 10 shown in FIG. 1 except that it is provided with a dedicated calibration transmitter 24 coupled to a corresponding power amplifier 26 and antenna 27. The calibration transmitter 24 generates an RX phase alignment signal which, via power amplifier 26 and antenna 27, is transmitted and thence received by antennas 20 and eventually RX signal paths 14, and is used by the digital front end 28 to calibrate the phase alignment amongst the RX signal paths 14.

While this approach allows RX phase alignment signals to be generated without disturbing the normal functional mode TX signal path alignments, it involves additional component cost and additional size of the transceiver. Although this strategy may have minimal impact on very large arrays (e.g. 8×8 MIMO arrays or larger) inasmuch as only a single alignment signal generator would be required and shared across the entire array of RX signal paths, the impact remains non-negligible. Of course, the impact is more significant on smaller MIMO arrays (e.g. a 4×4 MIMO transceiver).

There remains, therefore, a need for a technique for generating an RX phase alignment signal for phase alignment of TX and RX signal paths in MIMO transceivers which overcomes the above-described disadvantages of known approaches.

BRIEF DESCRIPTION OF THE DRAWINGS

Embodiments of the present invention will now be described, by way of example only, with reference to the attached Figures, wherein.

DETAILED DESCRIPTION

Figure 1:
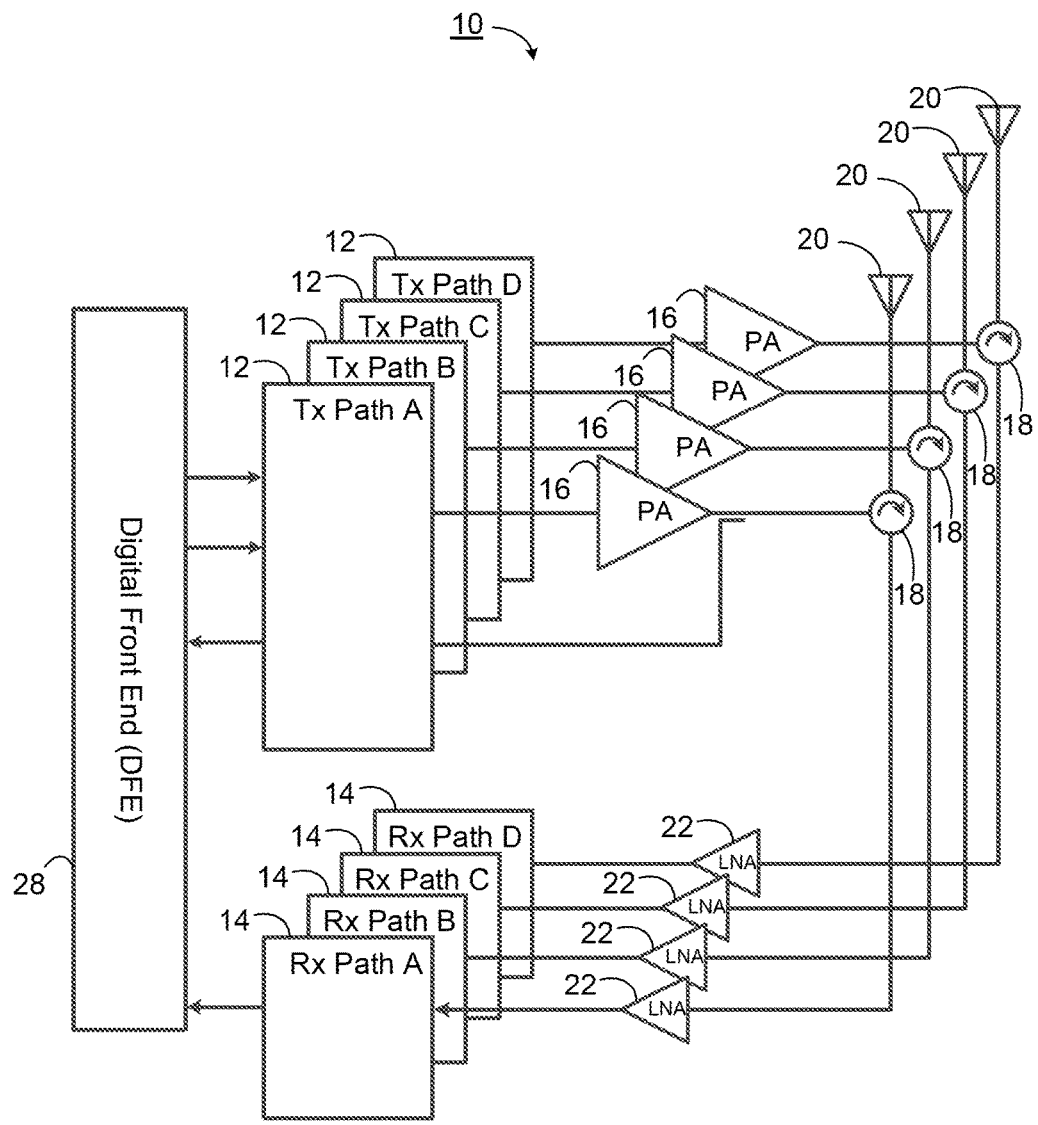
FIG. 1 is a block diagram of a known MIMO transceiver circuit.
Figure 2:
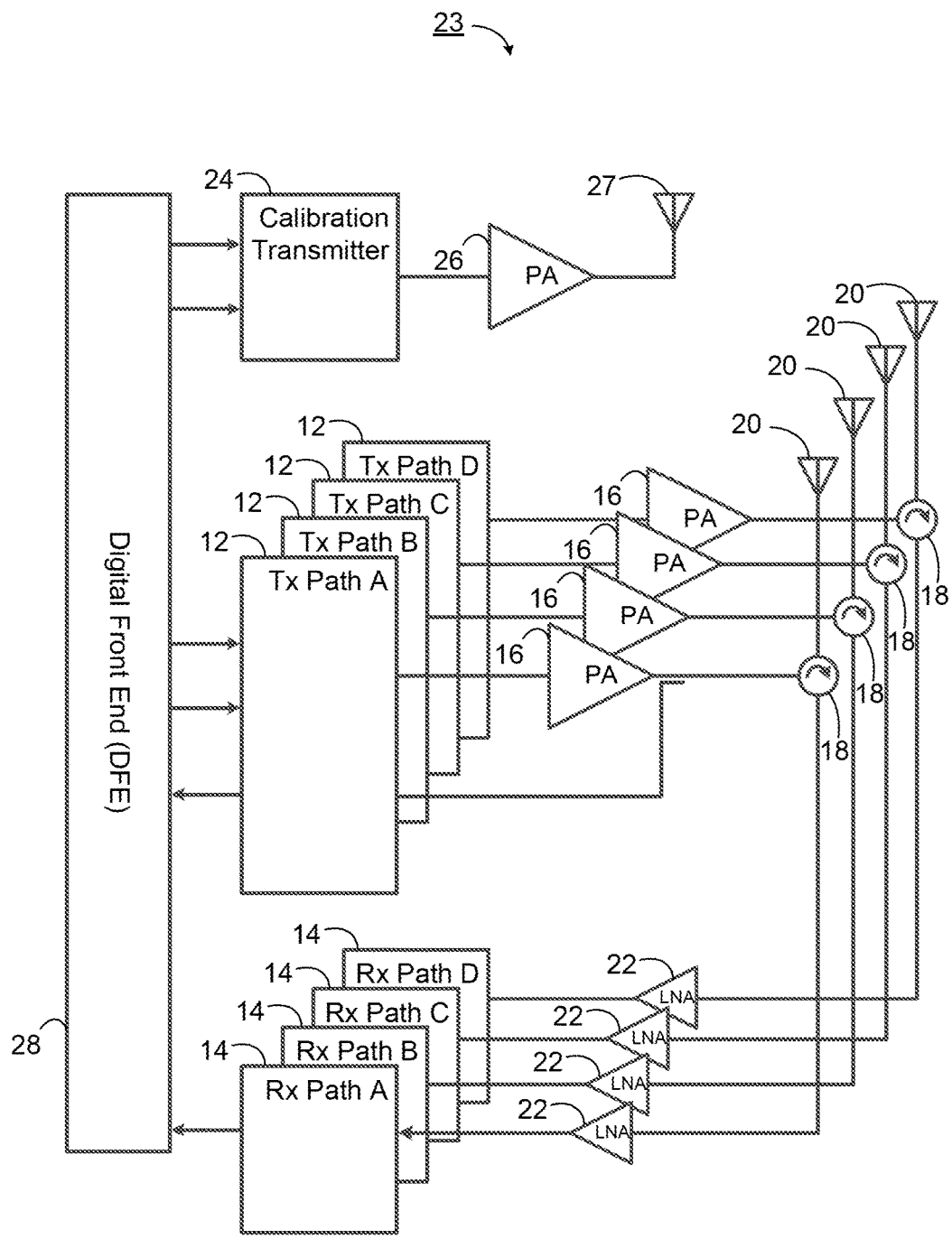
FIG. 2 is a block diagram of a known MIMO transceiver circuit having a calibration transmitter.

An RX phase alignment signal generation technique described herein enables a TX signal path to generate a phase alignment signal for the purpose of RX signal path phase alignment without disturbing the phase of that TX signal path's normal TX signal path.

In general, the technique recognizes that, since significant circuitry is already available in each local TX signal path whose express function is to generate signals, it is desirable to provide a TX signal path architecture which allows the TX signal path to be configured so that it can generate an alignment signal for the RX signal paths at a selected frequency.

In one embodiment, a TX signal path circuit in a MIMO transceiver is responsive to a DFE of the MIMO transceiver for alternatively generating TX signals in a TX signal mode, or RX path phase alignment signals for phase alignment of a plurality of RX signal paths of the MIMO transceiver in a RX phase alignment mode. The TX signal path circuit comprises a digital up-conversion block, a digital-to-analog converter (DAC) coupled to the digital up-conversion block, and an RF up-conversion block coupled to the DAC. The digital up-conversion block receives digital baseband signals from the DFE and generates digital intermediate frequency (IF) signals based on the digital baseband signals. The digital up-conversion block is coupled to a first numerically-controlled oscillator (NCO) for modulating the digital baseband signals to generate the digital IF signals in the TX signal mode, and is further coupled to a second NCO different from the first NCO for modulating the digital baseband signals to generate the digital IF signals in the RX phase alignment mode. The DAC receives the digital IF signals and generates analog IF signals based on the digital IF signals. The RF up-conversion block receives the analog IF signals and generates analog RF signals based on the analog IF signals. The RF up-conversion block is coupled to a TX local oscillator (LO) for modulating the analog IF signals to generate the analog RF signals in the TX signal mode, and is further coupled to a feedback (FB) LO different from the TX LO for modulating the analog IF signals to generate the analog RF signals in the RX phase alignment mode.

The RF up-conversion block may comprise a first divide-by-2 IQ generation (IQ-DIV2) circuit coupled to the TX LO for modulating the analog IF signals to generate the analog RF signals in the TX signal mode. The RF up-conversion block may further comprise a second IQ-DIV2 circuit coupled to the FB LO for modulating the analog IF signals to generate the analog RF signals in the RX phase alignment mode, wherein the second IQ-DIV2 circuit is different from the first IQ-DIV2 circuit.

The RF up-conversion block may further comprise analog frequency mixers coupled to the first IQ-DIV2 circuit for generating the analog RF signals in the TX signal mode. The analog frequency mixers may be coupled to the second IQ-DIV2 circuit for generating the analog RF signals in the RX phase alignment mode.

The RF up-conversion block may further comprise a multiplexer that couples the analog frequency mixers to the first IQ-DIV2 circuit in the TX signal mode. The multiplexer may couple the analog frequency mixers to the second IQ-DIV2 circuit in the RX phase alignment mode.

The multiplexer may decouple the analog frequency mixers from the first IQ-DIV2 circuit in the RX phase alignment mode.

The digital up-conversion block may further comprises digital frequency mixers coupled to the first NCO for generating the digital IF signals in the TX signal mode. The digital frequency mixers may be coupled the second NCO for generating the digital IF signals in the RX phase alignment mode.

The digital up-conversion block may further comprise a multiplexer that couples the first NCO to the digital frequency mixers in the TX signal mode. The multiplexer may couple the second NCO to the digital frequency mixers in the RX phase alignment mode.

The multiplexer may decouple the first NCO from the digital frequency mixers in the RX phase alignment mode.

The TX signal path circuit may further comprise a feedback circuit for monitoring RF output signals based on the TX signals in the TX signal mode, or based on the RX phase alignment signals in the RX phase alignment mode. The feedback circuit may comprise the FB LO for down-converting the RF output signals.

The TX signal path circuit may comprise a printed circuit board or an RFIC.

In another embodiment, a MIMO transceiver comprises a plurality of RX signal paths, a DFE, and a TX signal path circuit responsive to the DFE for alternatively generating TX signals in a TX signal mode, or RX path phase alignment signals for phase alignment of the plurality of RX signal paths in a RX phase alignment mode. The TX signal path circuit comprises a digital up-conversion block, a DAC coupled to the digital up-conversion block, and an RF up-conversion block coupled to the DAC. The digital up-conversion block receives digital baseband signals from the DFE and generates digital IF signals based on the digital baseband signals. The digital up-conversion block is coupled to a NCO for modulating the digital baseband signals to generate the digital IF signals in the TX signal mode, and is further coupled to a second NCO different from the first NCO for modulating the digital baseband signals to generate the digital IF signals in the RX phase alignment mode. The DAC receives the digital IF signals and generates analog IF signals based on the digital IF signals. The RF up-conversion block receives the analog IF signals and generates analog RF signals based on the analog IF signals. The RF up-conversion block is coupled to a TX LO for modulating the analog IF signals to generate the analog RF signals in the TX signal mode, and is further coupled to a FB LO different from the TX LO for modulating the analog IF signals to generate the analog RF signals in the RX phase alignment mode.

The RF up-conversion block may comprise a first IQ-DIV2 circuit coupled to the TX LO for modulating the analog IF signals to generate the analog RF signals in the TX signal mode. The RF up-conversion block may further comprise a second IQ-DIV2 circuit coupled to the FB LO for modulating the analog IF signals to generate the analog RF signals in the RX phase alignment mode, wherein the second IQ-DIV2 circuit is different from the first IQ-DIV2 circuit.

The RF up-conversion block may further comprise analog frequency mixers coupled to the first IQ-DIV2 circuit for generating the analog RF signals in the TX signal mode. The analog frequency mixers may be coupled to the second IQ-DIV2 circuit for generating the analog RF signals in the RX phase alignment mode.

The RF up-conversion block may further comprise a multiplexer that couples the analog frequency mixers to the first IQ-DIV2 circuit in the TX signal mode. The multiplexer may couple the analog frequency mixers to the second IQ-DIV2 circuit in the RX phase alignment mode.

The multiplexer may decouple the analog frequency mixers from the first IQ-DIV2 circuit in the RX phase alignment mode.

The digital up-conversion block may further comprise digital frequency mixers coupled to the first NCO for generating the digital IF signals in the TX signal mode. The digital frequency mixers may be coupled the second NCO for generating the digital IF signals in the RX phase alignment mode.

The digital up-conversion block may further comprise a multiplexer that couples the first NCO to the digital frequency mixers in the TX signal mode. The multiplexer may couple the second NCO to the digital frequency mixers in the RX phase alignment mode.

The multiplexer may decouple the first NCO from the digital frequency mixers in the RX phase alignment mode.

The TX signal path circuit may further comprise a feedback circuit for monitoring RF output signals based on the TX signals in the TX signal mode, or based on the RX phase alignment signals in the RX phase alignment mode, the feedback circuit comprising the FB LO for down-converting the RF output signals.

Figure 3:
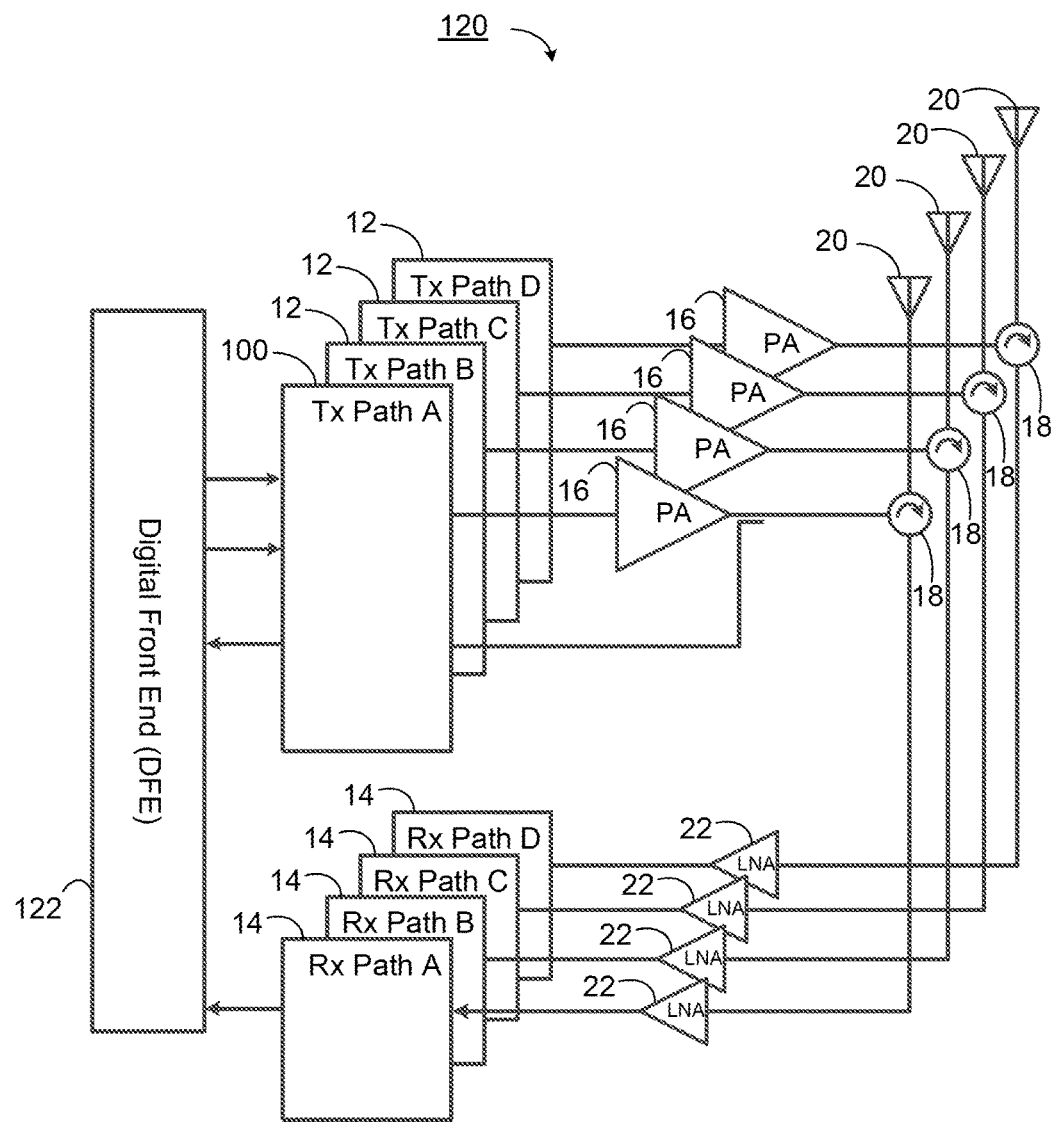
FIG. 3 is a block diagram of a MIMO transceiver circuit including a TX signal path circuit configured for RX phase alignment signal generation.

Thus, FIG. 3 shows a MIMO transceiver 120 employing a TX signal path 100 configured for RX alignment signal generation as described herein. The transceiver has four TX signal paths 12, 100 labeled "TX Path X", and likewise four RX signal paths 14 labeled "RX Path X", where X=A, B, C, or D. Each TX signal path 12, 100 and RX signal path 14 is generally embodied in a corresponding signal path circuit, and in some embodiments are embodied as PCB's or RFIC's. One of the TX signal paths 100 is configured for RX alignment signal generation when the MIMO transceiver 120 is operating in an RX phase alignment mode, but is otherwise identical to the other TX signal paths 12 and functions to generate ordinary TX signals when the MIMO transceiver 120 is operating in a TX signal mode. It will be appreciated that the MIMO transceiver 120 may be provided with any number of TX signal paths 12, 100 and RX signal paths 14 as is desirable, and four of each of these are presented here by way of example only. It will also be appreciated that more than one TX signal path 100 configured for RX phase alignment signal generation may be provided, although only one is shown by way of example.

TX signal path 100 is configured for RX phase alignment signal generation as described herein. Each TX signal path 12, 100 outputs to a corresponding power amplifier 16, which is connected to a corresponding coupler 18, and thence to a corresponding antenna 20. Also connected to each coupler 18 is a corresponding low noise amplifier 22 which leads to a corresponding one of the RX signal paths 14. Each TX signal path 12, 100 and RX signal path 14 interfaces with digital front end 122 which is configured to perform an RX phase alignment method.

Figure 4:
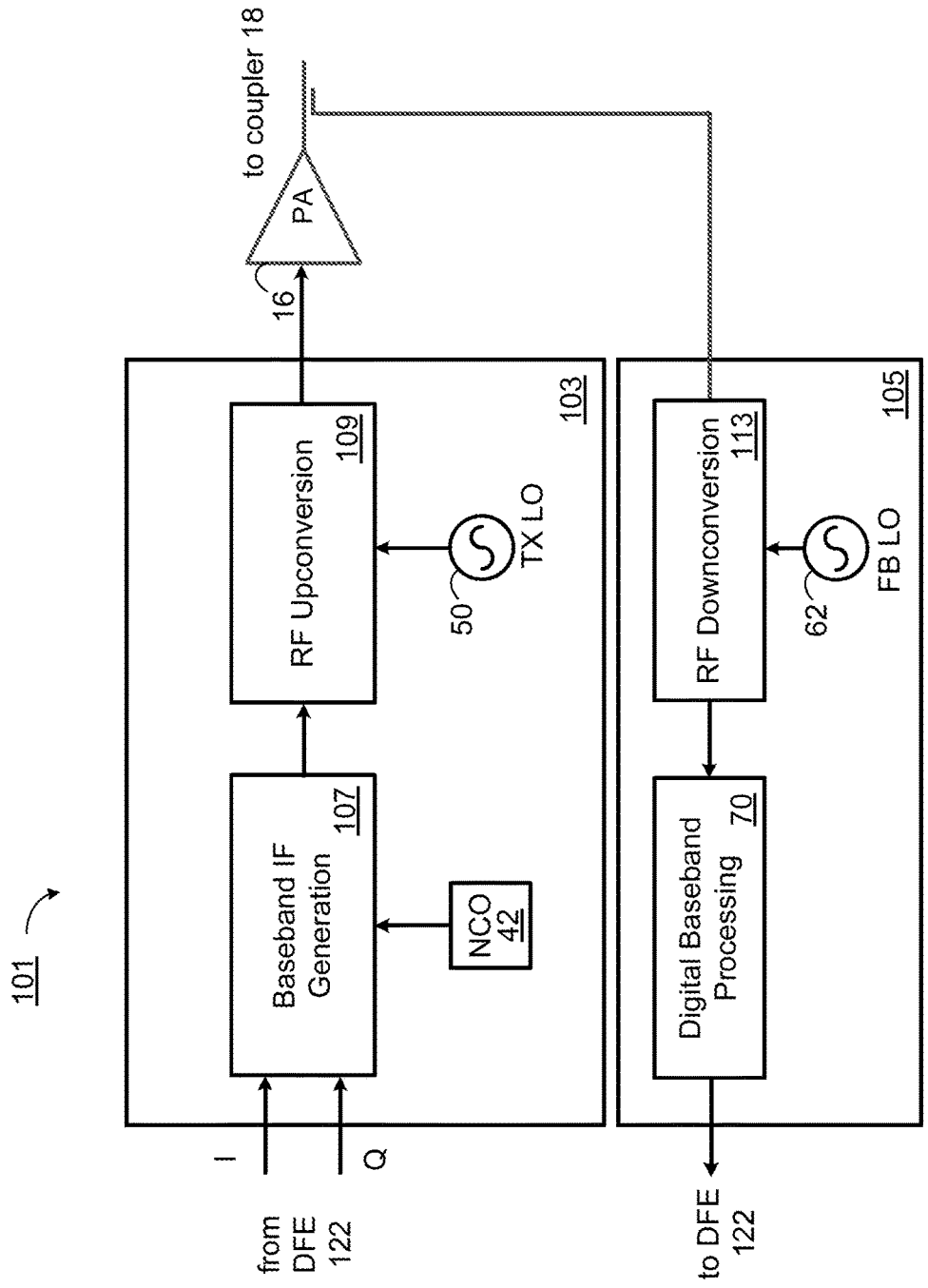
FIG. 4 is a block diagram of a general TX signal path circuit.

FIG. 4 shows one embodiment of a TX signal path 101 configured for RX alignment signal generation, and thus in one embodiment TX signal path 100 may be implemented as an instance of the TX signal path 101 shown in FIG. 4. The TX signal path 101 may in general be implemented as a TX signal path circuit, and in certain embodiments may be implemented as a PCB or as an RFIC. The TX signal path 101 has a feed forward or TX circuit 103 and a feedback circuit 105. The TX circuit 103 is operative to generate a TX signal or an RX phase alignment signal, while the feedback circuit 105 is operative to observe an output signal based on the TX signal or RX phase alignment signal, as the case may be, at the output of power amplifier 16.

The TX path 103 may be an embodiment of a low-intermediate frequency (low IF) quadrature modulator wherein the conversion from digital baseband data to the low IF is done through digital up-conversion circuitry. Thus, the TX path 103 includes a baseband IF generation block 107 which receives in-phase (I) and quadrature (Q) complex baseband input samples from DFE 122 which is similar to DFE 28 and is further configured to cause the TX path 103 to generate RX phase alignment signals as described herein.

The baseband IF generation block 107 translates the complex baseband input samples I, Q to a new intermediate frequency (IF), and for this purpose is coupled to or includes a numerically controlled oscillator (NCO) 42 which determines the intermediate frequency. The baseband IF generation block 107 may also be configured to convert the translated digital IF signal to an analog IF signal, though this step may also be performed by the RF upconversion block 109 now described or an additional component of the TX path 103. The TX path 103 further includes an RF upconversion block 109 which is functional to upconvert the analog IF signal to an analog RF signal. The RF upconversion block 109 is coupled to or includes a TX LO 50 which determines the RF frequency. As indicated, the RF upconversion block 109 may be further configured to convert the digital IF signal to the analog IF signal before upconversion to the analog RF signal. The analog RF signal is then transmitted to power amplifier 16 and thence to coupler 18 as described above.

In general, the TX signal path 101 is useful for generating an RX phase alignment signal wherein the digital front end 122 causes NCO 42 to select or sweep through the frequencies of interest for normalizing the phase alignment of the RX signal paths. The power amplifier 16 and other circuits in the TX path 103 tend to distort or compress the TX signal. Therefore, the feedback circuit 105 observes the final output signal and monitors it for distortion. Based on this distortion, it is possible to learn the distorting behavior of the TX circuit and then the signal can be adjusted digitally (by the digital front end 122) to correct for this distorting behavior of the TX circuit. This process is called digital pre-distortion (DPD). A maximally flexible feedback circuit may have an independent feedback (FB) LO 62 signal so that the FB signal can be downconverted by an RF downconversion block 113 to a digital intermediate frequency that is not necessarily equal to the TX digital IF. This digital intermediate frequency signal is then processed by digital baseband processing block 70 and thence to DFE 122.

Figure 5:
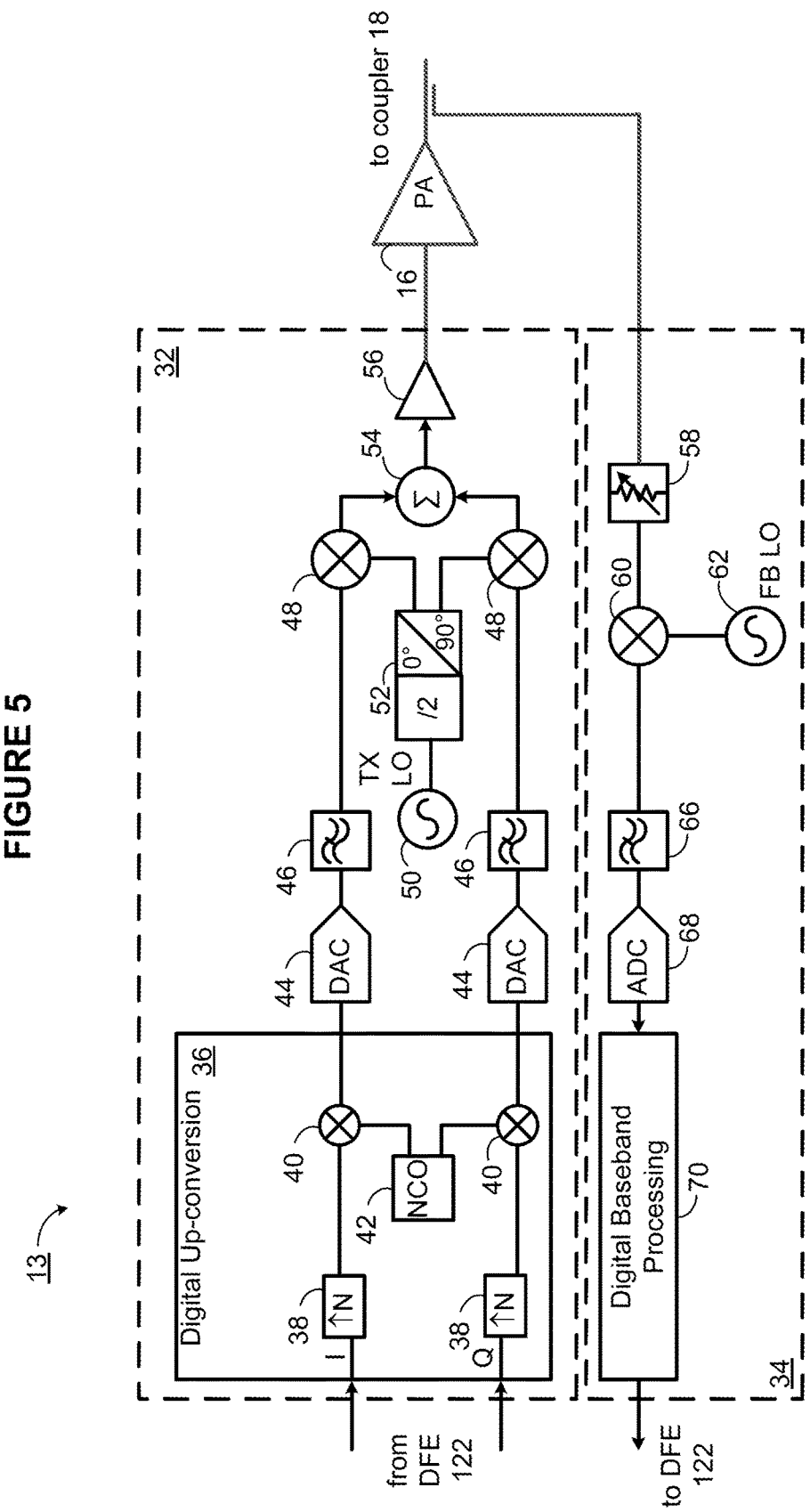
FIG. 5 is a block diagram of a particular embodiment of the general TX signal path circuit of FIG. 4.

FIG. 5 shows a TX signal path 13 which is one particular embodiment of the general TX signal path 101 shown in FIG. 4. Again, the TX signal path 13 may be implemented in any convenient TX signal path circuit which may include a PCB or an RFIC. The TX signal path 13 may likewise may be a low IF quadrature modulator wherein the conversion from baseband data to the low IF is done through digital up-conversion circuitry. The TX signal path 13 has a feed forward or TX circuit 32 and a feedback circuit 34. The TX circuit 32 is operative to generate a TX signal in TX signal mode and an RX phase alignment signal in RX phase alignment mode, while the feedback circuit 34 is operative to observe the output signal at the output of power amplifier 16.

The TX circuit 32 has a digital up-conversion block 36 which receives in-phase (I) and quadrature (Q) complex baseband input samples from DFE 122. The I and Q signal components are received by respective interpolators 38 which selectively increase the sample rate of the baseband input samples received from the DFE 122. The interpolators 38 output to corresponding digital frequency mixers 40 thereby modulating the output of complex NCO 42. The modulated signals are then received by corresponding digital-to-analog converters (DAC's) 44 followed by respective baseband filters 46. These signals are translated to RF frequencies by mixing in analog frequency mixers 48 with in phase and quadrature components of a TX LO 50 signal generated by a IQ-DIV2 generator circuit 52, described further below. The mixed signals are then superimposed by adder 54 and output to amplifier 56 before finally being output to power amplifier 16.

The digital up-conversion block 36 thus translates the complex baseband input samples I, Q to a new intermediate frequency utilizing an NCO whose output is multiplied with the complex baseband samples to frequency translate the baseband signals to the frequency specified by the NCO. An analog quadrature modulator is then used to upconvert the intermediate frequency signal to the final desired RF frequency.

The analog quadrature modulator requires 2 LO signals, with a 90° phase offset between them. Typically these signals are hard-clipped clock signals, and in some cases may be thought of as a square wave signal which takes values of +/−1 and has an instantaneous transition between these two states and spends nominally half of the clock period at the +1 state and then the next half of the clock period at the −1 state.

Figure 6:
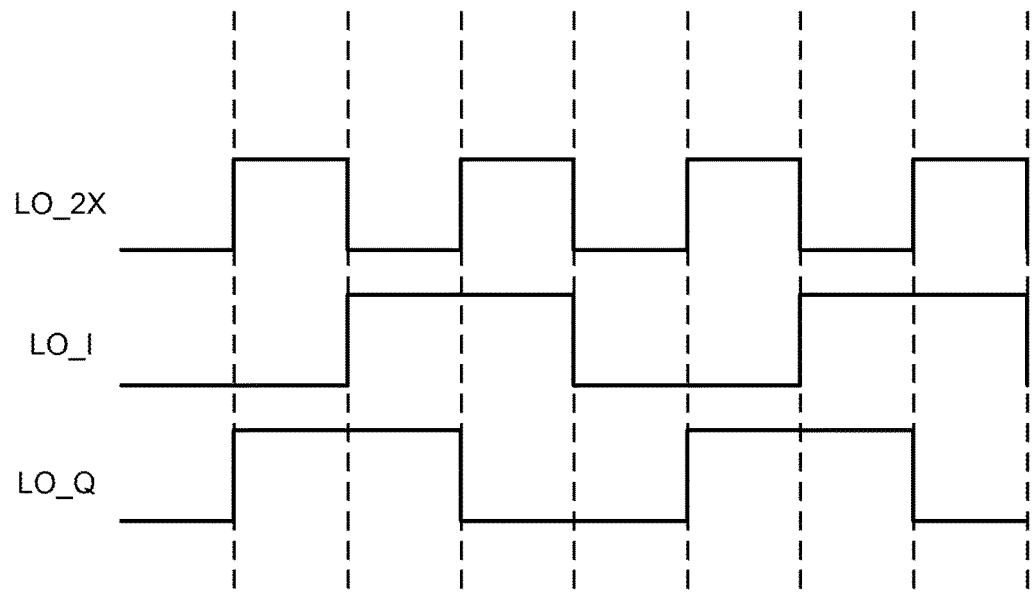
FIG. 6 is a timing diagram illustrating the operation of an IQ-DIV2 generator circuit.
Figure 7:
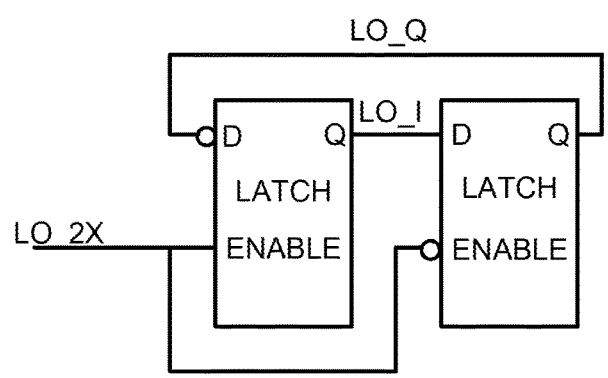
FIG. 7 is a block diagram of an IQ-DIV2 generator circuit.

With reference to FIG. 6, the IQ-DIV2 generator circuit employs a standard method to generate the I/Q LO signals. A square wave signal tone LO_2X is generated by TX LO at double the frequency of the desired LO signal, and is then passed it through the IQ-DIV2 circuit which divides the frequency by two and generates the in-phase signal LO_I and quadrature signal LO_Q. Because the double frequency signal LO_2X transitions from +1 to −1 4 times during every clock cycle of the desired LO signal frequency, the transitions of the double frequency signal LO_2X have all the necessary information to generate the I/Q LO signals with a 90° phase separation, as shown in FIG. 6. The circuit used to generate the two output phases of the LO signal is commonly referred to as a divide-by-two quadrature generator, IQ-DIV2, and as shown in FIG. 7 it is fundamentally a digital circuit created from latches clocked by the double rate clock and the complementary version of the double rate clock.

Returning to FIG. 5, the feedback circuit 34 is provided to allow observation of the output signal at the output of the power amplifier 16. This output signal is received by a variable attenuator 58 which outputs to frequency mixer 60. A feedback LO 62 outputs to frequency mixer 60 which outputs to a baseband filter 66 to an analog-to-digital converter (ADC) 68 and thence to a digital baseband processing block 70 which outputs to the DFE 122. The feedback circuit 34 observes the final output signal and monitors it for distortion. Based on this distortion, the DFE determines the distorting behavior of the TX circuit 32 and then the signal can be adjusted digitally by the digital front end 122 to correct for this distorting behavior of the TX circuit 32.

As indicated above, the TX signal paths 101, 13 shown in FIGS. 4 & 5 are useful for generating an RX phase alignment signal. In order to generate an alignment signal in the RX frequency band through one of the TX signal paths, however, the TX LO frequency and the baseband digital up-conversion circuitry may need to be temporarily reconfigured. A temporary configuration change to alter the frequency of a LO generation circuit may affect uncontrollably the phase of the LO signal, and the reconfiguration of the baseband digital up-conversion circuitry may alter uncontrollably the delay between the baseband input signal and the up-converted low-IF output signal.

If a normal TX signal path is used to generate the RX alignment signal despite the fact that reconfiguration may disturb the phase alignment of that TX signal path in normal functional mode, then re-alignment may be needed after the RX alignment signal is no longer required. Aligning the TX signal paths commonly involves employing a single RX signal path to measure a test signal generated by each independent TX signal path. For similar reasons, this may disturb the alignment of that single RX signal path when it is used for calibration of all TX signal paths. Thus, improvements over this approach are desirable so as to enable alignment of all RX signal paths and separately alignment of all TX signal paths.

Thus, in one embodiment, the technique employs a local FB LO signal of the TX signal path to generate a LO signal for the RX phase alignment signal generation, while leaving the TX LO circuitry operating in its normal, TX signal, mode. The FB LO can be employed as a convenient available LO signal. The multiple MIMO TX signal paths do not rely on any alignment between the distinct FB paths that are associated with each TX signal path. Consequently, the FB LO may be temporarily reconfigured to a unique frequency—that is, whatever LO frequency is needed to generate a RX path alignment signal. In order to feed the FB LO signal to be used in the TX path, additional LO multiplexing circuitry may be employed. In one embodiment, the LO multiplexing circuitry is implemented such that, in normal operation, the activity of the normal FB LO does not leak into the main TX LO circuitry through the multiplexing circuits. Thus, in one embodiment, IQ-DIV2 circuits in the TX LO functional path may be duplicated and made available during RX alignment signal generation. The original portion of the TX LO circuitry is thus left undisturbed and operating in its normal mode. Digital signal processing circuits that enable the digital baseband circuits to generate the RX alignment signal may be duplicated or bypassed without disturbing the phase alignment of the normal mode digital baseband circuits.

Figure 8:
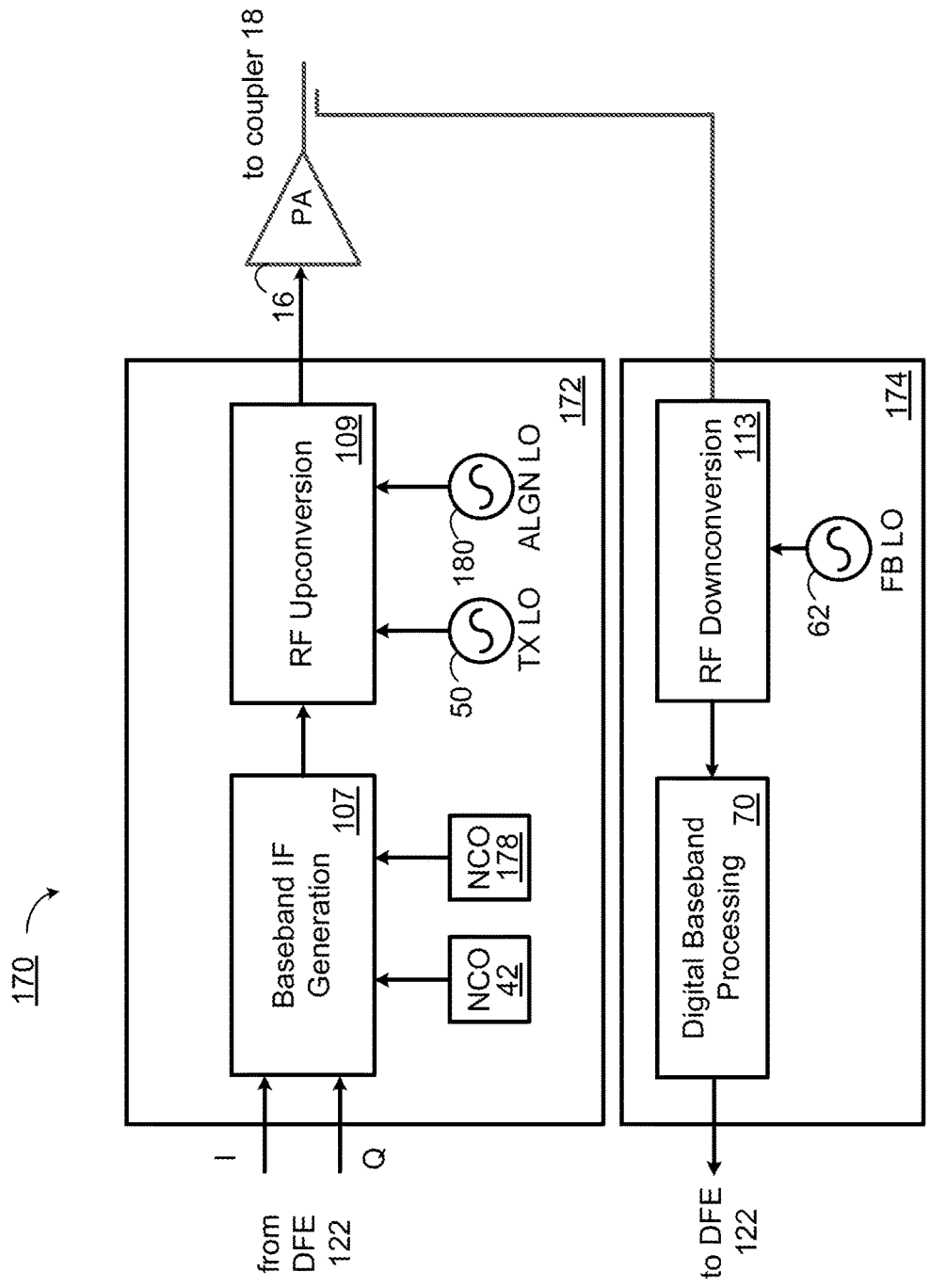
FIG. 8 is a block diagram of a first general TX signal path circuit configured to generate an RX phase alignment signal.
Figure 9:
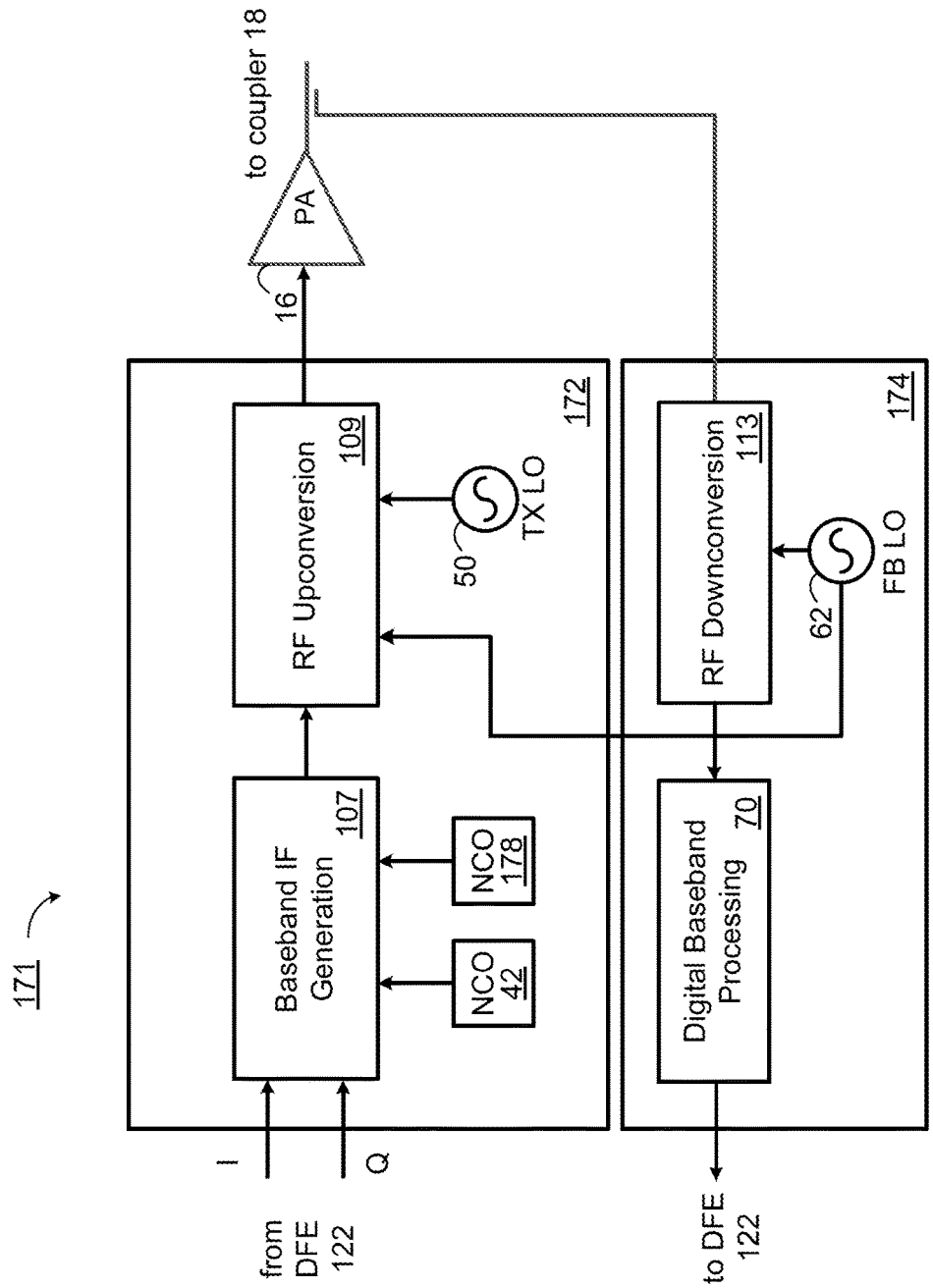
FIG. 9 is a block diagram of a second general TX signal path circuit configured to generate an RX phase alignment signal.
Figure 10:
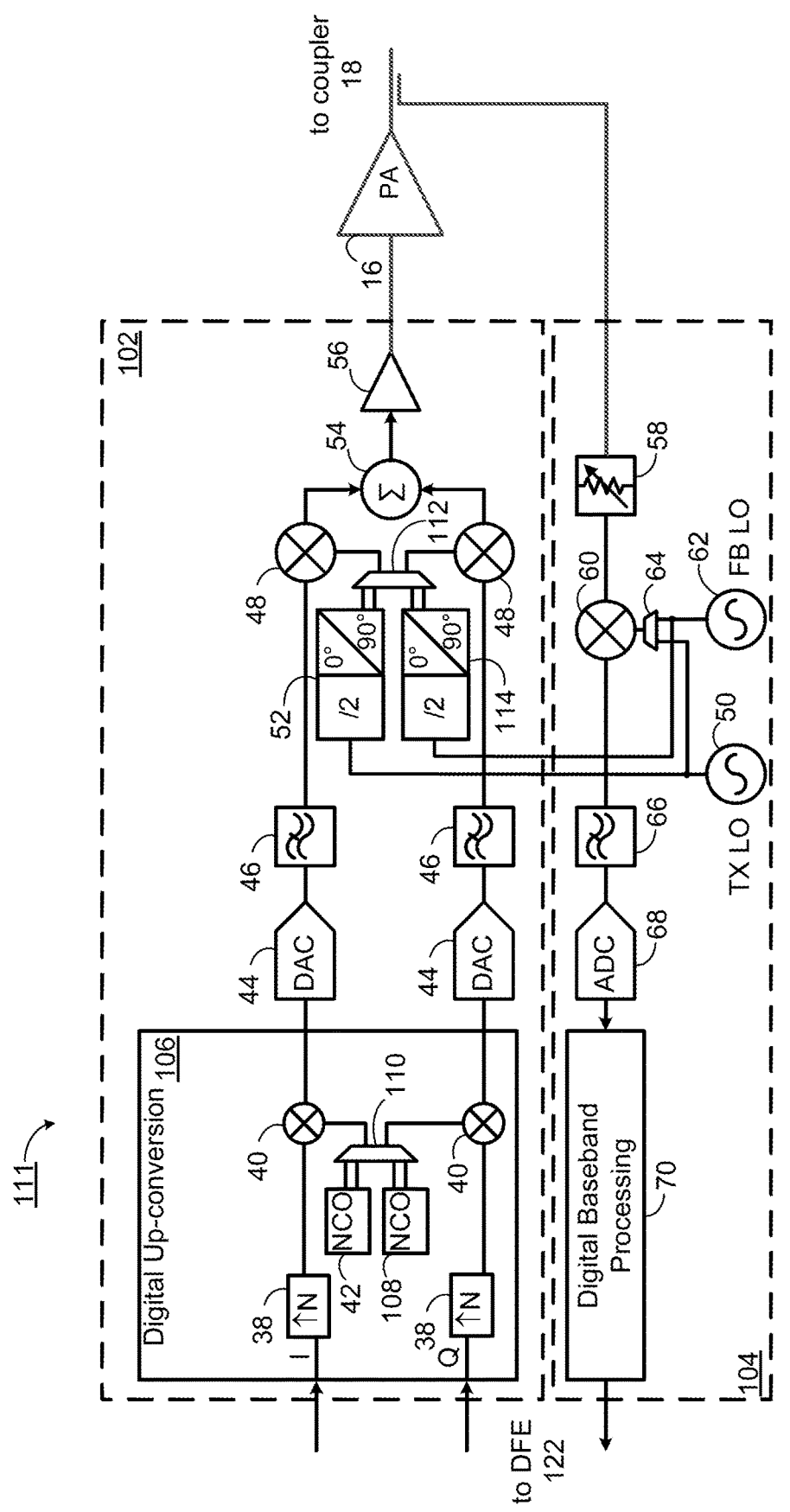
FIG. 10 is a block diagram of a particular embodiment of the second general TX signal path circuit configured to generate an RX phase alignment signal of FIG. 9.

Thus, FIGS. 8-10 show TX signal paths which are improved over the TX signal paths shown in FIGS. 4 & 5 when used for RX phase alignment signal generation.

FIG. 8 shows one embodiment of an improved TX signal path 170 configured for RX phase alignment signal generation, and thus in one embodiment TX signal path 100 of MIMO transceiver 120 in FIG. 3 may be implemented as an instance of the TX signal path 170 shown in FIG. 8. The TX signal path 170 may in general be implemented as a TX signal path circuit, and in certain embodiments may be implemented as a PCB or as an RFIC. The TX signal path 170 has a feed forward or TX circuit 172 similar to the TX circuit 103, and a FB circuit 174 similar to the FB circuit 105, as shown in FIG. 4. The TX circuit 172 is operative to generate TX signals in TX signal mode, RX phase alignment signals in RX phase alignment mode. Feedback circuit 174 is operative to observe the output signal at the output of power amplifier 16.

The TX circuit 172 may be an embodiment of a low-intermediate frequency (low IF) quadrature modulator wherein the conversion from digital baseband data to the low IF is done through digital up-conversion circuitry. Thus, the TX circuit 172 includes a baseband IF generation block 107 which receives in-phase (I) and quadrature (Q) complex baseband input samples from DFE 122 and translates the complex baseband input samples I, Q to a new intermediate frequency (IF). For this purpose, the baseband IF generation block 107 is coupled to or includes NCO 42 which determines the intermediate frequency. The baseband IF generation block 107 may also be configured to convert the translated digital IF signal to an analog IF signal, though this step may also be performed by the RF upconversion block 109 now described. The TX circuit 172 further includes an RF upconversion block 109 which is functional to upconvert the analog IF signal to an analog RF signal. The RF upconversion block 109 is coupled to or includes TX LO 50 which determines the RF frequency. As indicated, the RF upconversion block 109 may be further configured to convert the digital IF signal to the analog IF signal before upconversion to the analog RF signal. The analog RF signal is then transmitted to power amplifier 16 and thence to coupler 18 as described above.

Thus, with respect to the generation of a TX signal in an ordinary, TX signal, mode of operation, the TX signal path 170 operates similarly to the TX signal path 101 shown in FIG. 4. For the purpose of generating an RX phase alignment signal, however, the TX signal path 170 is provided with additional components which are used during RX phase alignment signal generation in place of certain components used only in TX signal generation and whose configuration is therefore not disturbed during RX phase alignment signal generation.

Thus, in one embodiment, the TX circuit 172 is provided with an additional NCO 178, wherein NCO 42 is used only during TX signal generation, and NCO 178 is used only during RX phase alignment signal generation. Similarly, the TX circuit 172 is provided with an additional alignment (ALGN) LO 180, wherein the TX LO 50 is used only during TX signal generation, and the ALGN LO 180 is used only during RX phase alignment signal generation. Use of NCO 178 and ALGN LO 180 during RX phase alignment signal generation avoids a need to reconfigure NCO 42 or TX LO 50, and thus avoids the disadvantages indicated above.

FIG. 9 shows a TX signal path 171 which is a variant of the TX signal path 170 wherein, instead of providing an additional ALGN LO 180 for use during RX phase alignment signal generation, the FB LO 62 already provided in the FB circuit 174 is used. The FB LO 62 can be temporarily configured to generate whatever LO frequency is needed to produce the desired alignment signal frequency for the local array of RX paths without disturbing TX LO 50 and thus the phase alignment of TX signal path 170 for TX signal generation. Reuse of the FB LO 62 for this purpose provides the advantage of reduced circuit size and cost.

In addition, in order to generate the necessary baseband input signals during the time when the RF output signal is intended to be an alignment signal for the local array of RX paths, the baseband IF generation block may include sufficient independent circuitry to enable it to generate an arbitrary tone frequency and phase based on NCO 178 without impacting the phase delay of the normal operational mode digital baseband signal path circuits.

Thus, TX signal paths 170, 171 are useful for generating an RX alignment signal wherein the digital front end 122 causes NCO 178 to select or sweep through the frequencies of interest for normalizing the phase alignment of the RX signal paths. The feedback circuit 174 observes the final output signal following power amplifier 16 and monitors it for distortion caused by the various components of TX circuit 172. The output signal is downconverted to a new intermediate frequency, which may be the same as or different from the intermediate frequency generated by baseband IF generation block 107, by RF downconversion block 113. This analog IF signal is then converted to a baseband digital signal by digital baseband processing block 70, and is then output to DFE 122. Based on this distortion, the distorting behavior of the TX circuit 172 is determined by the DFE 122 and the signal is adjusted digitally by the DFE 122 to correct for this distorting behavior of the TX circuit 172.

FIG. 10 shows TX signal path 111 which is a particular embodiment of TX signal path 171 shown in FIG. 9. The TX single path 111 is similar to the TX signal path 13 shown in FIG. 5, with certain differences as follows. TX signal path 111 has a feed forward or TX circuit 102 and a feedback circuit 104. The TX circuit 102 is operative to generate a TX signals in a TX signal mode, RX phase alignment signals in an RX phase alignment mode. TX signal path 111 further has a feedback circuit 104 operative to observe the output signal at the output of power amplifier 16. As will be described below, the TX circuit 102 and the feedback circuit 104 cooperate to produce RX phase alignment signals.

The TX circuit 102 has a digital up-conversion block 106 which receives in-phase (I) and quadrature (Q) components of a sampled digital signal from DFE 122. The I and Q signal components are received by respective interpolators 38 which selectively increase the sample rate of the baseband input samples received from the DFE 122. The interpolators 38 output to corresponding digital frequency mixers 40. The digital up-conversion block 106 is provided with a first NCO 42 and is also provided with a second NCO 108. The first NCO 42 provides a signal for translating the complex baseband input signals I, Q to a first predetermined intermediate frequency during a normal operational mode, or TX signal mode, of the TX signal path 111. The second NCO 108 provides a signal for translating the complex baseband input signals I, Q to a second predetermined intermediate frequency, which may be different from the first predetermined intermediate frequency, during an RX phase alignment operational mode of the TX signal path 111. The digital up-conversion block 106 further has a MUX 110 configured to select the first NCO 42 in the TX signal mode of the TX circuit 102, and to select the second NCO 108 in the RX phase alignment operational mode of the TX circuit 102. The output of MUX 110 is received by digital frequency mixers 40.

The outputs of digital frequency mixers 40 are then received by corresponding DAC's 44 followed by respective baseband filters 46. These signals are received by analog frequency mixers 48 which receive output from MUX 112. The TX circuit 102 has a first functional mode IQ-DIV2 generator circuit 52 which receives the output of TX LO 50. TX circuit 102 also has a second IQ-DIV2 generator circuit 114 which receives output from FB LO 62. MUX 112 is configured to select the output of the first IQ-DIV2 generator circuit 52 in the normal, TX signal, operational mode of the TX circuit 102, and to select the second IQ-DIV2 generator circuit 114 in the RX phase alignment operational mode of the TX circuit 102. The respective in-phase and quadrature components output by the MUX 112 are mixed by analog frequency mixers 48, are then superimposed by adder 54, and are then output to amplifier 56 before finally being output to power amplifier 16 which generates the RF output signal.

The feedback circuit 104 is provided to allow observation of the signal at the output of the power amplifier 16. This signal is received by an attenuator 58 which outputs to frequency mixer 60. A feedback LO 62 outputs to MUX 64 along with the TX LO 50. The frequency mixer 60 outputs to a baseband filter 66 to an ADC 68 and thence to a digital baseband processing block 70 which outputs to DFE 122.

In the RX phase alignment mode, the FB LO 62 can be temporarily configured to generate whatever LO frequency is needed to produce the desired alignment signal frequency for the local array of RX paths. In order to generate the necessary baseband input signals during the time when the RF output signal is intended to be an alignment signal for the local array of RX paths, the digital up-conversion circuitry may include sufficient independent circuitry to enable it to generate an arbitrary tone frequency and phase without impacting the phase delay of the normal operational mode digital baseband signal path circuits.

It will be appreciated that, in general, the IQ-DIV2 circuit 52 holds phase information in the value of its current logic state of its output latch (+1 or −1). If during RX alignment mode the FB LO signal was fed into the main TX signal path IQ-DIV2 circuit 52, and then later the main TX LO signal (which runs at double the final TX LO frequency) was returned to drive the main TX signal path IQ-DIV2 circuit, this would introduce a +/−180° uncertainty in the final normal TX path LO phase, because the phase of the IQ-DIV2 output latches would have a state that is determined by the uncontrollable hand-over between the normal functional path TX LO and the FB path LO signal that was used when the RX alignment signal was being generated through employing the FB LO signal.

This issue is addressed by the provision of the second IQ-DIV2 circuit 114 for use in generating an RX alignment signal. When the FB LO signal is used for this purpose, it drives the dedicated second IQ-DIV2 circuit 114 that is used only during the generation of the RX alignment signal, and during this period the double frequency TX LO signal remains active and clocks the normal functional TX path IQ-DIV2 52 so that the long term phase of the TX LO I and Q signals is preserved.

As indicated above, digital up-conversion circuit 106 translates the complex baseband (I, Q) input samples to a new intermediate frequency utilizing first NCO 42. The complex NCO output is multiplied with the complex baseband samples to frequency translate the baseband signals to the frequency specified by the NCO.

In order to preserve the phase of the TX path for normal operation, however, second NCO 108 is provided and employed only during the generation of RX alignment signals. The first NCO 42 continues to operate in its normal operating mode in order to maintain phase alignment with other TX paths in the system.

While the TX signal paths above have been described as providing advantages when used to provide a phase alignment signal for phase alignment of multiple RX paths in a MIMO transceiver, it will be appreciated that they also provides advantage whenever it is desired to generate an alternative signal for any purpose without disturbing the phase of a TX path.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A transmit (TX) signal path circuit in a multiple-input, multiple-output (MIMO) transceiver, the TX signal path circuit being responsive to a digital front end (DFE) of the MIMO transceiver for alternatively generating TX signals in a TX signal mode, or receive (RX) path phase alignment signals for phase alignment of a plurality of RX signal paths of the MIMO transceiver in a RX phase alignment mode, the TX signal path circuit comprising:
  a digital up-conversion block for receiving digital baseband signals from the DFE and for generating digital intermediate frequency (IF) signals based on the digital baseband signals, the digital up-conversion block being coupled to a first numerically-controlled oscillator (NCO) for modulating the digital baseband signals to generate the digital IF signals in the TX signal mode, and the digital up-conversion block being further coupled to a second NCO different from the first NCO for modulating the digital baseband signals to generate the digital IF signals in the RX phase alignment mode;
  a digital-to-analog converter (DAC) coupled to the digital up-conversion block for
  receiving the digital IF signals and for generating analog IF signals based on the digital IF signals; and
  a radio frequency (RF) up-conversion block coupled to the DAC for receiving the analog IF signals and for generating analog RF signals based on the analog IF signals, the RF up-conversion block being coupled to a TX local oscillator (LO) for modulating the analog IF signals to generate the analog RF signals in the TX signal mode, and the RF up-conversion block being further coupled to a feedback (FB) LO different from the TX LO for modulating the analog IF signals to generate the analog RF signals in the RX phase alignment mode, wherein the RF up-conversion block comprises a first divide-by-2 in-phase quadrature-phase (IQ) generation (IQ-DIV2) circuit coupled to the TX LO for modulating the analog IF signals to generate the analog RF signals in the TX signal mode, wherein the RF up-conversion block further comprises a second IQ-DIV2 circuit coupled to the FB LO for modulating the analog IF signals to generate the analog RF signals in the RX phase alignment mode, and wherein the second IQ-DIV2 circuit is different from the first IQDIV2 circuit.

2. The TX signal path circuit according to claim 1, wherein the RF up-conversion block further comprises analog frequency mixers coupled to the first IQ-DIV2 circuit for generating the analog RF signals in the TX signal mode, and wherein the analog frequency mixers are coupled to the second IQ-DIV2 circuit for generating the analog RF signals in the RX phase alignment mode.

3. The TX signal path circuit according to claim 2, wherein the RF up-conversion block further comprises a multiplexer that couples the analog frequency mixers to the first IQ-DIV2 circuit in the TX signal mode, and wherein the multiplexer couples the analog frequency mixers to the second IQ-DIV2 circuit in the RX phase alignment mode.

4. The TX signal path circuit according to claim 3, wherein the multiplexer decouples the analog frequency mixers from the first IQ-DIV2 circuit in the RX phase alignment mode.

5. The TX signal path circuit according to claim 1, wherein the digital upconversion block further comprises digital frequency mixers coupled to the first NCO for generating the digital IF signals in the TX signal mode, and wherein the digital frequency mixers are coupled the second NCO for generating the digital IF signals in the RX phase alignment mode.

6. The TX signal path circuit according to claim 5, wherein the digital upconversion block further comprises a multiplexer that couples the first NCO to the digital frequency mixers in the TX signal mode, and wherein the multiplexer couples the second NCO to the digital frequency mixers in the RX phase alignment mode.

7. The TX signal path circuit according to claim 6, wherein the multiplexer decouples the first NCO from the digital frequency mixers in the RX phase alignment mode.

8. The TX signal path circuit according to claim 1 further comprising a feedback circuit for monitoring RF output signals based on the TX signals in the TX signal mode, or based on the RX phase alignment signals in the RX phase alignment mode, the feedback circuit comprising the FB LO for down-converting the RF output signals.

9. The TX signal path circuit according to claim 1, wherein the TX signal path circuit comprises a printed circuit board.

10. The TX signal path circuit according to claim 1, wherein the TX signal path circuit comprises a radio frequency integrated circuit.

11. A multiple-input, multiple-output (MIMO) transceiver comprising a plurality of receive (RX) signal paths, a digital front end (DFE), and a transmit (TX) signal path circuit responsive to the DFE for alternatively generating TX signals in a TX signal mode, or receive (RX) path phase alignment signals for phase alignment of the plurality of RX signal paths in a RX phase alignment mode, the TX signal path circuit comprising:

a digital up-conversion block for receiving digital baseband signals from the DFE and for generating digital intermediate frequency (IF) signals based on the digital baseband signals, the digital up-conversion block being coupled to a first numerically-controlled oscillator (NCO) for modulating the digital baseband signals to generate the digital IF signals in the TX signal mode, and the digital up-conversion block being further coupled to a second NCO different from the first NCO for modulating the digital baseband signals to generate the digital IF signals in the RX phase alignment mode, a digital-to-analog converter (DAC) coupled to the digital up-conversion block for receiving the digital IF signals and for generating analog IF signals based on the digital IF signals; and a radio frequency (RF) up-conversion block coupled to the DAC for receiving the analog IF signals and for generating analog RF signals based on the analog IF signals, the RF up-conversion block being coupled to a TX local oscillator (LO) for modulating the analog IF signals to generate the analog RF signals in the TX signal mode, and the RF up-conversion block being further coupled to a feedback (FB) LO different from the TX LO for modulating the analog IF signals to generate the analog RF signals in the RX phase alignment mode, wherein the RF up-conversion block comprises a first divide-by-2 in-phase quadrature-phase (IQ) generation (IQ-DIV2) circuit coupled to the TX LO for modulating the analog IF signals to generate the analog RF signals in the TX signal mode, wherein the RF up-conversion block further comprises a second IQ-DIV2 circuit coupled to the FB LO for modulating the analog IF signals to generate the analog RF signals in the RX phase alignment mode, and wherein the second IQ-DIV2 circuit is different from the first IQ-DIV2 circuit.

12. The MIMO transceiver according to claim 11, wherein the RF up-conversion block further comprises analog frequency mixers coupled to the first IQ-DIV2 circuit for generating the analog RF signals in the TX signal mode, and wherein the analog frequency mixers are coupled to the second IQ-DIV2 circuit for generating the analog RF signals in the RX phase alignment mode.

13. The MIMO transceiver according to claim 12, wherein the RF up-conversion block further comprises a multiplexer that couples the analog frequency mixers to the first IQ-DIV2 circuit in the TX signal mode, and wherein the multiplexer couples the analog frequency mixers to the second IQ-DIV2 circuit in the RX phase alignment mode.

14. The MIMO transceiver according to claim 13, wherein the multiplexer decouples the analog frequency mixers from the first IQ-DIV2 circuit in the RX phase alignment mode.

15. The MIMO transceiver according to claim 11, wherein the digital up-conversion block further comprises digital frequency mixers coupled to the first NCO for generating the digital IF signals in the TX signal mode, and wherein the digital frequency mixers are coupled the second NCO for generating the digital IF signals in the RX phase alignment mode.

16. The MIMO transceiver according to claim 15, wherein the digital upconversion block further comprises a multiplexer that couples the first NCO to the digital frequency mixers in the TX signal mode, and wherein the multiplexer couples the second NCO to the digital frequency mixers in the RX phase alignment mode.

17. The MIMO transceiver according to claim 16, wherein the multiplexer decouples the first NCO from the digital frequency mixers in the RX phase alignment mode.

18. The MIMO transceiver according to claim 11, wherein the TX signal path circuit further comprises a feedback circuit for monitoring RF output signals based on the TX signals in the TX signal mode, or based on the RX phase alignment signals in the RX phase alignment mode, the feedback circuit comprising the FB LO for down-converting the RF output signals.

19. A transmit (TX) signal path circuit in a multiple-input, multiple-output (MIMO) transceiver, the TX signal path circuit being responsive to a digital front end (DFE) of the MIMO transceiver for alternatively generating TX signals in a TX signal mode, or receive (RX) path phase alignment signals for phase alignment of a plurality of RX signal paths of the MIMO transceiver in a RX phase alignment mode, the TX signal path circuit comprising:
- a digital up-conversion block for receiving digital baseband signals from the DFE and for generating digital intermediate frequency (IF) signals based on the digital baseband signals, the digital up-conversion block being coupled to a first numerically-controlled oscillator (NCO) for modulating the digital baseband signals to generate the digital IF signals in the TX signal mode, and the digital up-conversion block being further coupled to a second NCO different from the first NCO for modulating the digital baseband signals to generate the digital IF signals in the RX phase alignment mode;
- a digital-to-analog converter (DAC) coupled to the digital up-conversion block for
- receiving the digital IF signals and for generating analog IF signals based on the digital IF signals; and
- a radio frequency (RF) up-conversion block coupled to the DAC for receiving the analog IF signals and for generating analog RF signals based on the analog IF signals, the RF up-conversion block being coupled to a TX local oscillator (LO) for modulating the analog IF signals to generate the analog RF signals in the TX signal mode, and the RF up-conversion block being further coupled to a feedback (FB) LO different from the TX LO for modulating the analog IF signals to generate the analog RF signals in the RX phase alignment mode, wherein the digital up-conversion block further comprises digital frequency mixers coupled to the first NCO for generating the digital IF signals in the TX signal mode, wherein the digital frequency mixers are coupled to the second NCO for generating the digital IF signals in the RX phase alignment mode, wherein the digital up-conversion block comprises a multiplexer that couples the first NCO to the digital frequency mixers in the TX signal mode, and wherein the multiplexer couples the second NCO to the digital frequency mixers in the RX phase alignment mode.

20. The TX signal path circuit according to claim 19, wherein the RF up-conversion block comprises a first divide-by-2 in-phase quadrature-phase (IQ) generation (IQ-DIV2) circuit coupled to the TX LO for modulating the analog IF signals to generate the analog RF signals in the TX signal mode, wherein the RF up-conversion block further comprises a second IQ-DIV2 circuit coupled to the FB LO for modulating the analog IF signals to generate the analog RF signals in the RX phase alignment mode, and wherein the second IQ-DIV2 circuit is different from the first IQDIV2 circuit.

21. The TX signal path circuit according to claim 20, wherein the RF up-conversion block further comprises analog frequency mixers coupled to the first IQ-DIV2 circuit for generating the analog RF signals in the TX signal mode, and wherein the analog frequency mixers are coupled to the second IQ-DIV2 circuit for generating the analog RF signals in the RX phase alignment mode.

22. The TX signal path circuit according to claim 21, wherein the RF up-conversion block further comprises a multiplexer that couples the analog frequency mixers to the first IQ-DIV2 circuit in the TX signal mode, and wherein the multiplexer couples the analog frequency mixers to the second IQ-DIV2 circuit in the RX phase alignment mode.

23. The TX signal path circuit according to claim 22, wherein the multiplexer decouples the analog frequency mixers from the first IQ-DIV2 circuit in the RX phase alignment mode.

24. The TX signal path circuit according to claim 19, wherein the multiplexer decouples the first NCO from the digital frequency mixers in the RX phase alignment mode.

25. The TX signal path circuit according to claim 19, comprising a feedback circuit for monitoring RF output signals based on the TX signals in the TX signal mode, or based on the RX phase alignment signals in the RX phase alignment mode, the feedback circuit comprising the FB LO for down-converting the RF output signals.

26. The TX signal path circuit according to claim 19, wherein the TX signal path circuit comprises a printed circuit board.

27. The TX signal path circuit according to claim 19, wherein the TX signal path circuit comprises a radio frequency integrated circuit.

28. A multiple-input, multiple-output (MIMO) transceiver comprising a plurality of receive (RX) signal paths, a digital front end (DFE), and a transmit (TX) signal path circuit responsive to the DFE for alternatively generating TX signals in a TX signal mode, or receive (RX) path phase alignment signals for phase alignment of the plurality of RX signal paths in a RX phase alignment mode, the TX signal path circuit comprising:
- a digital up-conversion block for receiving digital baseband signals from the DFE and for generating digital intermediate frequency (IF) signals based on the digital baseband signals, the digital up-conversion block being coupled to a first numerically-controlled oscillator (NCO) for modulating the digital baseband signals to generate the digital IF signals in the TX signal mode, and the digital up-conversion block being further coupled to a second NCO different from the first NCO for modulating the digital baseband signals to generate the digital IF signals in the RX phase alignment mode,
- a digital-to-analog converter (DAC) coupled to the digital up-conversion block for
- receiving the digital IF signals and for generating analog IF signals based on the digital IF signals; and
- a radio frequency (RF) up-conversion block coupled to the DAC for receiving the analog IF signals and for generating analog RF signals based on the analog IF signals, the RF up-conversion block being coupled to a TX local oscillator (LO) for modulating the analog IF signals to generate the analog RF signals in the TX signal mode, and the RF up-conversion block being further coupled to a feedback (FB) LO different from the TX LO for modulating the analog IF signals to generate the analog RF signals in the RX phase alignment mode, wherein the digital up-conversion block further comprises digital frequency mixers coupled to the first NCO for generating the digital IF signals in the TX signal mode, wherein the digital frequency mixers are coupled the second NCO for generating the digital IF signals in the RX phase alignment mode, wherein the digital up-conversion block comprises a multiplexer that couples the first NCO to the digital frequency mixers in the TX signal mode, and wherein the multiplexer couples the second NCO to the digital frequency mixers in the RX phase alignment mode.

29. The MIMO transceiver according to claim 28, wherein the RF up-conversion block comprises a first divide-by-2 in-phase quadrature-phase (IQ) generation (IQ-DIV2) circuit coupled to the TX LO for modulating the analog IF signals to generate the analog RF signals in the TX signal mode, wherein the RF up-conversion block further comprises a second IQ-DIV2 circuit coupled to the FB LO for modulating the analog IF signals to generate the analog RF signals in the RX phase alignment mode, and wherein the second IQ-DIV2 circuit is different from the first IQ-DIV2 circuit.

30. The MIMO transceiver according to claim 29, wherein the RF up-conversion block further comprises analog frequency mixers coupled to the first IQ-DIV2 circuit for generating the analog RF signals in the TX signal mode, and wherein the analog frequency mixers are coupled to the second IQ-DIV2 circuit for generating the analog RF signals in the RX phase alignment mode.

31. The MIMO transceiver according to claim 30, wherein the RF up-conversion block further comprises a multiplexer that couples the analog frequency mixers to the first IQ-DIV2 circuit in the TX signal mode, and wherein the multiplexer couples the analog frequency mixers to the second IQ-DIV2 circuit in the RX phase alignment mode.

32. The MIMO transceiver according to claim 31, wherein the multiplexer decouples the analog frequency mixers from the first IQ-DIV2 circuit in the RX phase alignment mode.

33. The MIMO transceiver according to claim 28, wherein the multiplexer decouples the first NCO from the digital frequency mixers in the RX phase alignment mode.

34. The MIMO transceiver according to claim 28, wherein the TX signal path circuit further comprises a feedback circuit for monitoring RF output signals based on the TX signals in the TX signal mode, or based on the RX phase alignment signals in the RX phase alignment mode, the feedback circuit comprising the FB LO for down-converting the RF output signals.

\* \* \* \* \*